United States Patent [19]

Miller

[11] 3,768,659

[45] Oct. 30, 1973

[54] DRAIN VALVE FOR FUEL FILTER

[75] Inventor: Clarence R. Miller, Racine, Wis.

[73] Assignee: Tenneco Inc., Racine, Wis.

[22] Filed: Oct. 27, 1971

[21] Appl. No.: 192,891

[52] U.S. Cl................... 210/313, 55/433, 210/444
[51] Int. Cl............................................. B01d 29/42
[58] Field of Search........................... 55/421, 433; 210/313, 422, 444, 533

[56] References Cited
UNITED STATES PATENTS

| | | | |
|---|---|---|---|
| 2,061,343 | 11/1936 | Bichler et al. | 210/313 X |
| 3,364,658 | 1/1968 | Walker | 55/421 X |
| 2,471,069 | 6/1949 | Le Clair | 210/313 X |
| 2,508,015 | 5/1950 | Dexter | 210/313 X |
| 2,983,384 | 5/1961 | Winslow | 210/313 X |
| 2,270,924 | 1/1942 | Blair | 210/422 X |

Primary Examiner—Samih N. Zaharna
Assistant Examiner—Richard W. Burks
Attorney—Thomas E. Torphy

[57] ABSTRACT

A manually operated push button type valve placed at a low point in the outer shell of a fluid filter, such as those filters used to filter fuel for internal combustion engines, provides an efficient, economical means for draining immiscible fluids, such as water, from the filter.

11 Claims, 4 Drawing Figures

PATENTED OCT 30 1973 3,768,659

INVENTOR
CLARENCE R. MILLER

ATTORNEY
Thomas E Torphy

DRAIN VALVE FOR FUEL FILTER

FIELD OF THE INVENTION

This invention relates to a drain valve for fluid filters such as those filters used in conjunction with internal combustion engines, and particularly relates to improved drain valves for spin-on fuel filters used to filter contaminants from the fuel of diesel engines equipped with fuel injectors.

Immiscible fluids, such as water, which become entrained with fuel used to power internal combustion engines are detrimental to the efficient operation and durability of the engines and related equipment. Therefore, fuel filters, generally having a pleated paper filter media, have been employed to separate droplets of water entrained in the fuel stream from the fuel as the fuel is passed through the filter media. In such filters the separated water droplets, having a density greater than the fuel, are forced by gravity to slide down or drop off the upstream side of the filter media and collect at the lowest point on the inside of the filter shell. Prior art means for draining such collections of water from the bottom, or sump, of the filter shell have been well known petcocks, threaded drain plugs, or other conventional drainage valve means. Such prior art drainage valve means have been relatively expensive to manufacture and install, have often been difficult to operate, have been susceptible to having the threads stripped in them, and/or have been susceptible to being inadvertently left open by the person draining the accumulation of undesirable fluid from the filter.

SUMMARY OF THE INVENTION

The valve of this invention is comprised of a valve member having an integral valve actuation projection. The valve member is placed adjacent an inner surface of the lower end of a filter shell and the integral projection extends through an opening in the shell. The valve member is urged into sealing engagement with the inner surface of the shell surrounding the opening in the shell by conventional biasing means.

Manual pressure exerted upon the exposed projection of the valve member breaks the valve seal and enables undesirable fluids as well as particulate contaminants which have collected in the bottom of the filter shell to flow from the filter assembly. The filter element hold-down spring normally provided in spin-on fluid filters serves to maintain the valve member in a closed or sealed position in a preferred embodiment.

DETAILED DESCRIPTION OF THE INVENTION

Figure 1:
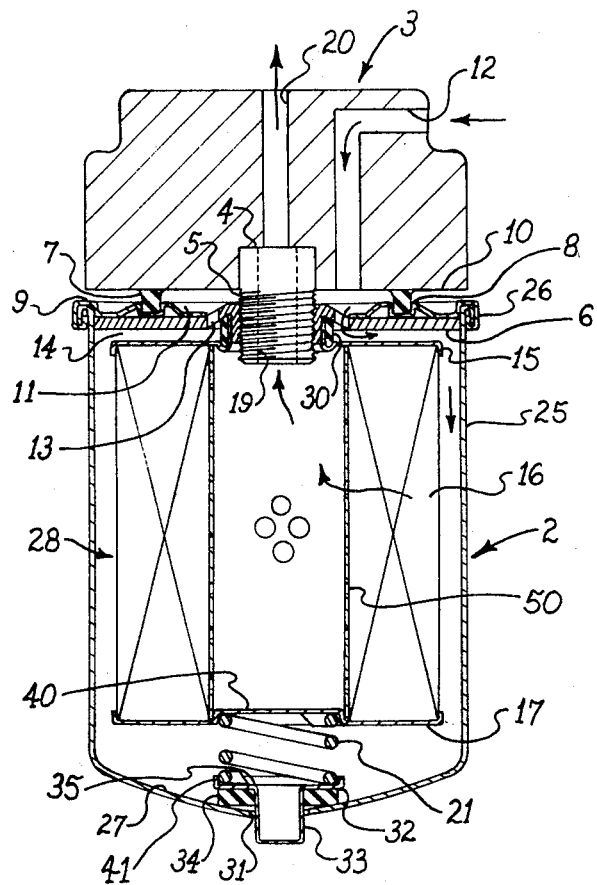
FIG. 1 is a cross-sectional view of a spin-on fluid filter assembly having a drain valve as disclosed herein and shown mounted upon a representative filter base.

FIG. 1 illustrates a spin-on type fluid filter assembly 2 mounted upon a representative filter base 3.

The filter assembly illustrated is comprised of a cylindrical outer shell 25, shell closure means comprised of attachment plate 6 and unit end cap 9, filter element assembly 28 and filter hold-down spring 21.

A threaded attachment stud 4, secured to filter base 3, is threadedly engaged with a threaded attachment opening 5 in attachment plate 6 to provide means for mounting filter assembly 2 onto filter base 3.

Attachment plate 6 and unit end cap 9 are fastened together, such as by spot welding, and unit end cap 9 is attached to an open end of shell 25 by means such as lock seam 26 to close the open end of the outer shell 25.

An annular, resilient seal means 7 shown seated in seal retaining depression 8 serves to seal the filter assembly 2 to an appropriate surface, such as 10, of the filter base 3.

Filter element 28 is comprised of a generally cylindrical filter medium 16 supported against collapse by a perforated tube 50 and sealed at one end by an end cap 15 and at the opposite end by an end cap 17. In conventional spin-on filter assemblies the compressive spring 21 engages element end cap 17 and the end 27 of filter shell 25. Compressive spring 21, conventionally called an element hold-down spring, forces an annular projection and seal means 30 into sealing engagement with attachment plate 6.

Fluid flow through the filter base 3 and filter element assembly 2 is indicated by arrows and described as follows. Fluid passage 12 in filter base 3 is connected to a source of fluid (not shown), such as conduits connected to a crankcase and oil pump or a fuel tank and fuel pump. The fluid flows through fluid passage 12 into chamber 11 and through inlet openings 13 in attachment plate 6. The fluid then flows radially outward parallel to attachment plate 6 in space 14 and into the annulus formed between filter medium 16 and the inner surface of outer shell 25.

The fluid is then forced through filter medium 16 and perforations in center tube 50. The now filtered fluid exits the filter through an opening 19 in threaded attachment stud 4 and exit passage 20 in filter base 3. Exit passage 20 is conventionally connected with appropriate conduits (not shown) to internal combustion engine fuel injection equipment, a carburetor, oil galleys, or the like, none of which are shown in the drawings.

In the present invention, an opening 31 is provided in the end 27 of shell 25.

A valve member comprising a disc 32, resilient seal 34 and valve actuation projection 33 is provided for closing opening 31. The valve member is placed within the filter assembly during manufacture. Valve actuation projection 33 projects through opening 31. Projection 33 should fit loosely in opening 31 to enable fluid to readily flow through opening 31 when the valve is opened, despite the presence of projection 33 within the opening.

Figure 4:
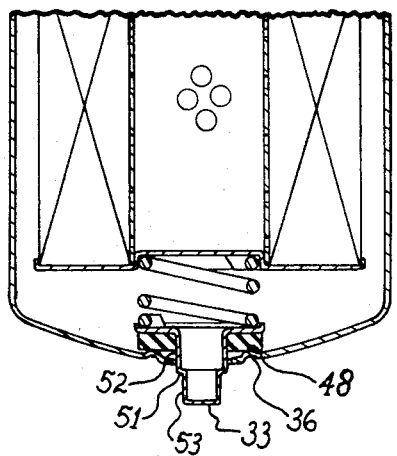
FIG. 4 is a partial cross-sectional view showing an alternate preferred embodiment of the invention herein disclosed.

Although the valve member comprising valve disc 32 and projection 33 is illustrated in the preferred embodiment of either FIG. 1 or FIG. 4 as a one piece metal stamping the valve member may obviously consist of a plurality of components, rather than having the valve actuation projection be an integral projection of the valve member.

Compressive element hold-down spring 21 is positioned to coact with the top surface 35 of valve disc 32 and the element end cap 17 of filter element assembly 28. Therefore, when the spin-on filter element assembly is completely assembled, as shown in FIG. 1, the element hold-down spring 21 urges the filter element assembly 28 into sealing engagement with the filter assembly attachment plate 6 by means of annular seal 30 and it also urges valve disc 32 into sealing engagement with the end 27 of the shell 25.

When in service on a filter base, as shown in FIG. 1, the contaminants, consisting of particulate matter and immiscible fluids, such as water, which are separated from the fuel as it passes through the filter medium 16, gravitate toward the end 27 of filter shell 25.

Periodically it is desirable to drain an accumulation of such contaminants from the filter shell.

With the valve as disclosed herein an accumulation of such contaminants is drained from the shell by pushing inwardly on projection 33 to overcome the compressive force of spring 21, thus breaking the seal formed between resilient seal 34 and the inner surface of the end 27 of the shell 25.

By maintaining the valve in this position the contaminants are able to flow through opening 31 to escape from the filter shell 25.

When the contaminants have been sufficiently drained from the shell inward pressure is removed from the projection 33 and element hold-down spring 21 again urges valve disc 32 via annular resilient seal 34 into sealing engagement with the end 27 of shell 25.

An annular depression 40 and an inwardly extending annular lip 41 are preferably provided on end cap 17 and valve disc 32 respectively to maintain hold-down spring 21 in a desired position whereby it is substantially incapable of lateral movement or cocking.

In some applications it may be desirable to maintain the valve in an open position for an extended period of time. Referring now to FIG. 4, in such applications it is desirable to provide a radially extending lip 51 on valve disc projection 33. Such a lip or shoulder, herein shown formed as an integral transition between a relatively radially larger upper portion 52 of projection 33 and a relatively radially smaller lower portion 53 of projection 33, serves to maintain the valve in an open position when the projection 33 is forced inward sufficiently, such as by a mechanic's finger, to cause the radial lip or shoulder 51 to pass through opening 31. Lateral force will then cause the lip to engage an edge of opening 31 and thereby the valve will be maintained open until a lateral force is exerted on the projection to cause it to again be substantially centered in opening 31 whereby it will pass through opening 31 by the urging of spring 21 and be maintained in a sealed position by the spring.

Also, provision of an internally extending annular projection 36, such as that shown in FIG. 4, is beneficial in many applications as it provides a substantially line contact seal between the resilient annular seal 30 and the crest 48 of the inwardly extending annular projection 36.

Figure 2:
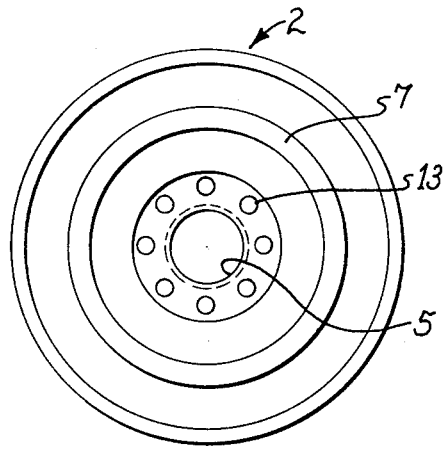
FIG. 2 is an end view of the filter assembly of FIG. 1.

FIG. 2 is an end view showing how annular resilient seal 7, threaded attachment opening 5, and filter assembly inlet opening 13 are typically arranged on a unit end cap assembly which is used to seal the open end of a conventional spin-on filter assembly 2.

Figure 3:
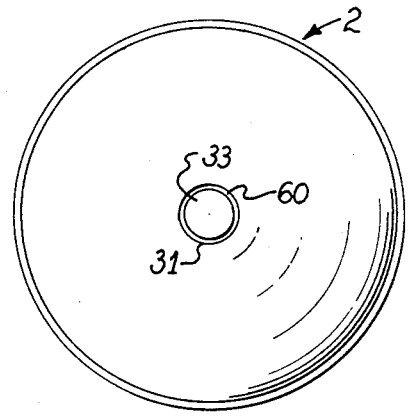
FIG. 3 is an end view of the other end of the filter assembly of FIG. 1.

FIG. 3 shows the annular fluid flow space 60 provided between the edges of opening 31 and the valve projection 33 in the end of filter assembly 2 opposite to that end shown in FIG. 3.

Upon having access to the teachings of this disclosure modifications to the preferred embodiment of the drainage valve herein disclosed will occur to those persons skilled in the art. Such modifications are intended to be included within the spirit and scope of this invention.

I claim:

1. In a filter assembly having an outer shell open at one end, a filter element within said shell and closure means for closing said open end of said shell, an improved drainage valve comprising:
   a. an opening in that end of said shell opposite said closure means;
   b. a valve member placed adjacent the inner surface of said shell for covering said opening;
   c. a filter element hold-down compressive spring between said filter element and said valve member for pressing said filter element into engagement with said closure means and for urging said valve member into sealing engagement with said inner surface of said shell surrounding said opening; and
   d. said valve member being actuable through said opening for permitting fluid flow through said opening.

2. The filter drainage valve as defined in claim 1 together with an annular inwardly extending projection surrounding said opening and contacting said valve means for providing an essentially line contact valve seat.

3. The filter drainage valve as defined in claim 1 in which said valve member further comprises a resilient seal means for engaging said inner surface of said shell.

4. The filter drainage valve as defined in claim 1 together with valve actuation means attached to said valve member and extending through said opening.

5. The filter drainage valve as defined in claim 4 in which said valve actuation means is an integral projection of said valve member.

6. The filter drainage valve as defined in claim 4, in which said valve actuation means has a radially extending shoulder formed as a transition between a portion of said valve actuation means and another portion of said valve actuation means being relatively smaller in cross-section whereby said shoulder can be placed against an edge defining said opening for maintaining said valve member in an unsealed or open position.

7. In a fluid filter assembly having a normally sealed drain valve member with an external actuator for unsealing said valve member the improvement comprising:
   a. a drain opening through which said actuator extends into said filter assembly for actuating said valve member;
   b. an edge surrounding said opening; and
   c. a radially extending shoulder on said actuator for engaging said edge of said opening when said actuator is pushed inward and then laterally toward a portion of said edge of said opening for maintaining said valve member in an unsealed position.

8. In a filter assembly having an outer shell open at one end, a filter element placed within the outer shell, and a filter element compressive hold-down spring placed between a closed end of said outer shell and an end of said filter element adjacent said closed end of said outer shell and closure means fastened to said open end of said outer shell whereby said filter element compressive hold-down spring serves for biasing that end of said filter element adjacent said closure means into sealingly engagement with said closure means a drainage valve comprising:

a. an opening in that end of said outer shell adjacent said compressive hold-down spring;
b. a valve member between said opening and said spring;
c. said valve member being urged into sealing engagement with the inner surface of said outer shell by said spring for preventing fluid flow through said opening; and
d. said valve member being actuable through said opening for permitting fluid flow through said opening.

9. The filter drainage valve defined in claim 8 together with an inwardly extending annulus surrounding said opening for providing a substantially line contact valve seat.

10. The filter drainage valve defined in claim 8 in which said valve member is a substantially rigid, circular disc having:

a. upstanding projection means about the periphery of said disc for providing assurance said disc will be maintained substantially coaxial with said compressive hold-down spring;
b. resilient seal means between said disc and said inner surface of said outer shell surrounding said opening; and
c. valve actuation means sealingly fastened to said disc and extending through said resilient seal means and said opening in said outer shell for permitting actuation of said valve by manually pressing inwardly on the exposed end of said valve actuation means.

11. The filter drainage valve as defined in claim 10 in which said valve actuation means has a radially extending shoulder formed as a transition between a portion of said valve actuation means and another portion of said valve actuation means being relatively smaller in cross-section whereby said shoulder can be placed against an edge defining said opening for maintaining said valve means in an unsealed or open position.

* * * * *

UNITED STATES PATENT OFFICE
CERTIFICATE OF CORRECTION

Patent No. 3,768,659     Dated October 30, 1973

Inventor(s) Clarence R. Miller

It is certified that error appears in the above-identified patent and that said Letters Patent are hereby corrected as shown below:

Column 3, line 55, the reference number "30" should be -- 34 --;

line 67, the Figure number "3" should be -- 2 --.

Signed and sealed this 5th day of March 1974.

(SEAL)
Attest:

EDWARD M. FLETCHER, JR.
Attesting Officer

C. MARSHALL DANN
Commissioner of Patents